M. LACHMAN.
SHEET METAL CONSTRUCTION.
APPLICATION FILED OCT. 24, 1913.
1,247,287.
Patented Nov. 20, 1917.
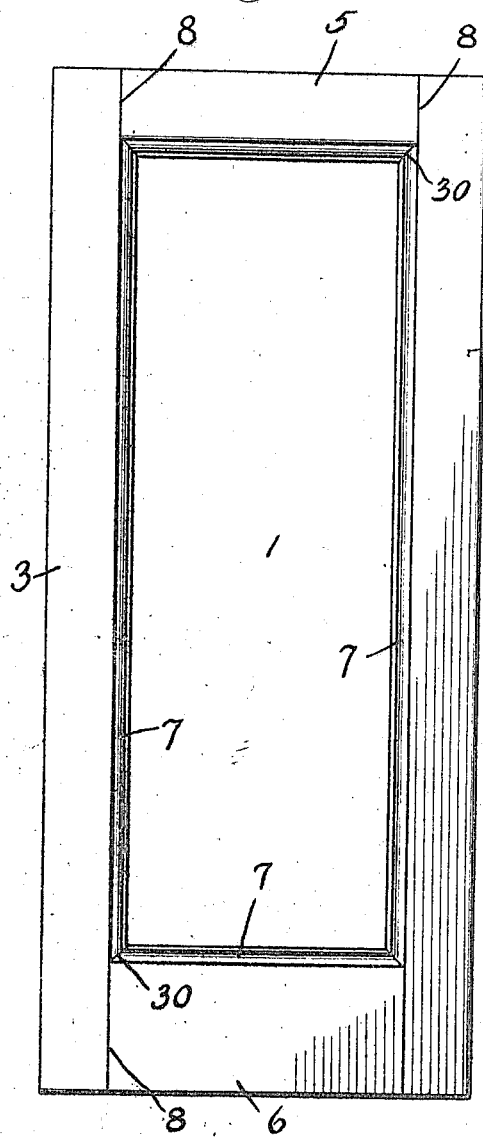
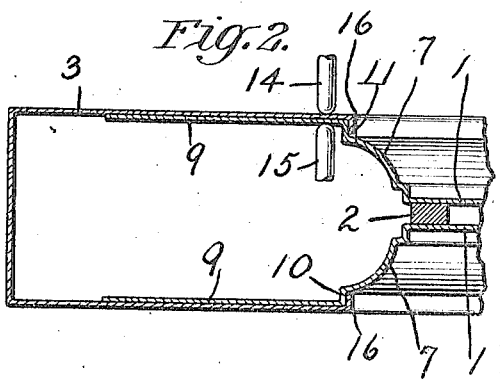
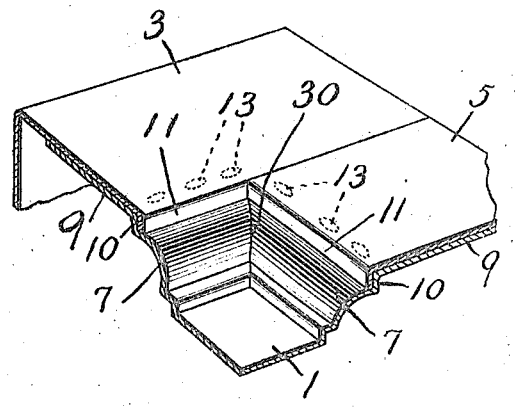
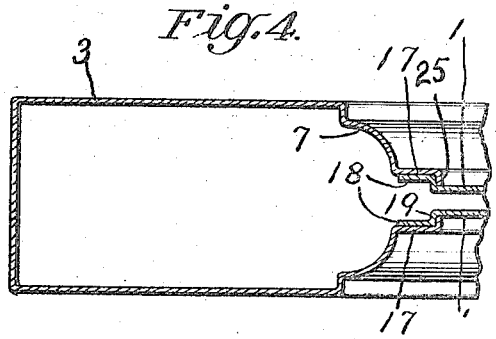
WITNESSES
F. B. Townsend
Henry A. Gens
INVENTOR
Maurice Lachman.
BY Townsend & Decke
ATTORNEYS

UNITED STATES PATENT OFFICE.

MAURICE LACHMAN, OF NEW YORK, N. Y., ASSIGNOR TO UNIVERSAL ELECTRIC WELDING COMPANY, OF NEW YORK, N. Y., A CORPORATION OF NEW YORK.

SHEET-METAL CONSTRUCTION.

1,247,287.

Specification of Letters Patent.

Patented Nov. 20, 1917.

Original application filed May 6, 1913, Serial No. 765,780. Divided and this application filed October 24, 1913. Serial No. 797,034.

*To all whom it may concern:*

Be it known that I, MAURICE LACHMAN, a citizen of the United States, and a resident of New York, in the county of New York and State of New York, have invented certain new and useful Improvements in Sheet-Metal Constructions, of which the following is a specification.

My present invention relates to sheet metal construction and particularly to the manner of joining overlapping surfaces of the metal to unite them together.

The invention is particularly applicable to the construction of paneled structures and is of vast importance in the construction of sheet metal doors and it is to the latter specific use that the invention will be described in detail as being applied to, it being understood however that the invention is not limited thereto.

The main object of the invention is to utilize the electric welding process for joining the sections of the construction to each other and at the same time to avoid the objections to the use of this process which have heretofore come up as a result of its attempted use in this connection. To accomplish this I provide a novel construction or relation of the parts to one another at or near the place of joining.

Heretofore while electric welding has been proposed and used to some extent in welding the parts of sheet metal panel work, it has never been successful to any marked degree owing to the buckling of the metal when the popular method of spot welding is employed, due to the localized heating of the parts and the localized pressure applied thereto. Also as the welding is necessarily done near the edge of at least one of the parts to be joined this has heretofore been attended with a roughening or burring of such edge.

The invention consists in the novel construction of sheet metal joint hereinafter more particularly described and then specified in the claims.

In the accompanying drawings, Figure 1 is a front elevation of a sheet metal door embodying this invention.

Fig. 2 is an enlarged cross-section of one stile member of the door shown in Fig. 1.

Fig. 3 is a perspective view of one corner of the construction.

Fig. 4 is a cross-section through a stile member illustrating a modification in the location of the joint.

1 indicates the panel of a door preferably made up of two metal plates or sheets spaced apart any desired distance by blocks 2 secured in any desired manner to the panel plates 1. The space within the panel may, if desired, be filled with sound-deadening material as well known in the art.

3 and 4 indicate the side frame or stile sections of the door while 5 and 6 indicate the top and bottom frame or stile sections respectively. Between the inner edges of the stile sections 3, 4, 5 and 6 and the surface of the panel 1 is formed or secured molding members 7 of any desired surface conformation or ornamentation. The molding members may form part of or be secured to either the stile sections or the panel member as will hereinafter appear. After the stile or frame sections are secured to the panel member as will be presently described, they may be joined to each other along the meeting edges 8 by brazing, soldering or any of the other methods now well known in the art.

As illustrated in Figs. 1 to 3 inclusive, the molding member 7 is integral with the panel plate 1 and by means of suitable dies stamped into the desired form. In this form, the molding member has an outwardly extending flange 9 which projects for a greater or less extent into the space within the stile sections and contacts with the inner surface of the side thereof, the flange 9 being offset from the molding whereby a shoulder 10 is formed at the inner edge of the stile section. The inner edge of the stile sections is turned over the shoulder 10 as at 11 and preferably contacts with the vertical wall of said shoulder, the free edge preferably engaging or seating on the surface of the molding 7 to form a close joint and prevent any raw edge of the metal being visible.

The flange 9 is welded to the inner surface of the face of the stile member preferably by a number of spot welds 13 disposed preferably near the longitudinal edge of the stile member. As will be readily understood by those skilled in the electric metal working art, the parts may be assembled between suitable current carrying electrodes 14, 15

(Fig. 2) and a current of electricity passed from one electrode to the other through the material located between them. After the metal has softened due to the heating effect of the current, pressure is applied by means of the electrodes and the sheets are welded together. In the case of spot welding, this process is repeated any desired number of times and in any desired place to form any number of points of welded union 13. The process is repeated for the opposite side of the door, the electrode 15 being inserted from the end of the stile section and after the welding is finished this end may be closed by soldering or brazing a plate therein as is well known in this art.

Should the inner edge of the stile members terminate on a line with the surface welded as for instance at 16, the welding operation would cause a buckling of the stile member and the edge 16 would become rough and have a serrated appearance. By turning over the edge to form the flange 11 all buckling and warping as well as any serrated edge is avoided.

As indicated in Fig. 4 the welding or joining of the sections may take place at the panel member rather than on the stile section as indicated in the previous figures.

In this case the molding 7 is preferably integral with the stile section and is provided with an inwardly projecting flange 17 which seats on a flange 18 offset from the panel 1 by a shoulder 19. The welding, as above described, takes place between the flanges 17 and 18 while the turned-over edge 25 prevents buckling as above described.

The corners 30 of the moldings 7 may be mated or joined together in any suitable manner as will be readily understood by those skilled in the art.

This application is a division of my prior application for patent for metal panel work, filed May 6th 1913, Serial No. 765,780.

What I claim as my invention is:—

In a metallic construction, the combination of two members in surface contact and welded together at spots along such contacting surfaces, a shoulder on one member adjacent the welded areas and a free edge of the other member turned over said shoulder.

Signed at New York in the county of New York and State of New York this 22nd day of October A. D. 1913.

MAURICE LACHMAN.

Witnesses:
F. B. TOWNSEND,
HENRY A. GENS.